(12) United States Patent
Elgressy et al.

(10) Patent No.: US 6,336,140 B1
(45) Date of Patent: Jan. 1, 2002

(54) METHOD AND SYSTEM FOR THE IDENTIFICATION AND THE SUPPRESSION OF EXECUTABLE OBJECTS

(75) Inventors: Doron Elgressy, Haifa; Asher Jospe, Natanya, both of (IL)

(73) Assignee: Computer Associates Think, Inc., Islandia, NY (US)

( * ) Notice: Subject to any disclaimer, the term of this patent is extended or adjusted under 35 U.S.C. 154(b) by 0 days.

(21) Appl. No.: 09/183,878

(22) Filed: Oct. 30, 1998

Related U.S. Application Data

(63) Continuation of application No. PCT/IL98/00082, filed on Feb. 23, 1998.

(30) Foreign Application Priority Data

Sep. 22, 1997 (IL) .................................... 121815

(51) Int. Cl.[7] .......................... G06F 15/173; G06F 15/16
(52) U.S. Cl. .......................................... 709/224; 709/229
(58) Field of Search .................................. 709/229, 224; 713/200, 201

(56) References Cited

U.S. PATENT DOCUMENTS

| | | | |
|---|---|---|---|
| 5,699,513 A | 12/1997 | Feigen et al. | 713/201 |
| 5,940,590 A | 8/1999 | Lynne et al. | 713/200 |
| 5,974,549 A | 10/1999 | Golan | 713/200 |
| 5,983,348 A | 11/1999 | Ji | 713/200 |
| 6,134,591 A | 10/2000 | Nickles | 709/121 |

FOREIGN PATENT DOCUMENTS

| EP | 0 666 671 A | 8/1995 |
|---|---|---|

OTHER PUBLICATIONS

Edwards N et al.: "High Security Web Servers and Gateways", Computer Networks and ISDN Systems, vol. 29, No. 8–13, Sep. 1997, pp. 927–938.

Sharon Machlis: "Screening for Applets", Computerworld, vol. 31, No. 6, Feb. 10, 1997, USA pp. 51–52.

*Primary Examiner*—Le Hien Luu

(57) ABSTRACT

A method for processing Executable Objects, comprising: (a) providing analysis means capable of non-interfering analysis of data packets transmitted on a communication line between a browser and an HTTP server on the web, said communication line being established through a gateway; (b) analyzing the handshake between said browser and said server, to detect a "GET_" command sent by the user and an HTTP code sent in response by said server; (c) when such an HTTP code is detected, analyzing the data packets transmitted by said server to said browser, by: (c.1) providing ordering means to order data packets received in non-sequential order, and to forward them in sequential order to header checking means; (c.2) checking the data packets so as to analyze the contents of the header of the Executable Object, and to identify the resources of the system that it needs to employ; (c.3) transmitting to said gateway data representing the resources of the system that the Executable Object needs to utilize; (c.4) providing data packet suppressing means coupled to said gateway, such that if the resources of the system that the Executable Object needs to utilize are not permitted according to the security policy set by the administrator, at least one data packet belonging to the Executable Object is suppressed, altered or damaged, so as to prevent the execution thereof by the browser.

9 Claims, 1 Drawing Sheet

METHOD AND SYSTEM FOR THE IDENTIFICATION AND THE SUPPRESSION OF EXECUTABLE OBJECTS

CROSS-REFERENCE TO RELATED APPLICATION

This application is a continuation of co-pending application PCT/IL98/00082 filed Feb. 23, 1998 entitled "Method and System for the Identification and the Suppression of Executable Objects".

FIELD OF THE INVENTION

The present invention relates to the security management of computer networks. More particularly, the invention relates to methods and systems for preventing the downloading and execution of undesirable Executable Objects in a workstation of a computer network.

BACKGROUND OF THE INVENTION

The Internet has developed very much both in respect of its contents and of the technology employed, since it began a few years ago. In the early days of the Internet, web sites included text only, and after a while graphics was introduced. As the Internet developed, many compressed standards, such as pictures, voice and video files, were developed and with them programs used to play them (called "players"). Initially, such files were downloaded to the user's workstation only upon his request, and extracted only by the appropriate player, and after a specific order from the user.

When, in the natural course of the development of the World Wide Web the search for a way to show nicer, interactive and animated Web Pages began, Sun Microsystems Inc. developed Java—a language that allows the webmaster to write a program, a list of commands—Network Executables— that will be downloaded to the user workstation without his knowledge, and executed by his browser at his workstation. The executables are used, e.g., to provide photographic animation and other graphics on the screen of the web surfer. Such executables have some ways approaching the user workstation's resources, which lead to a great security problem. Although some levels of security were defined in the Java language, it was very soon that a huge security hole was found in the language.

Since Java was developed, Microsoft developed ActiveX, which is another Network Executable format, also downloaded into the workstation. ActiveX has also security problems of the same kind.

The Internet has been flooded with "Network Executables" which may be downloaded—deliberately or without the knowledge of the users—into workstations within organizations. These codes generally contain harmless functions. Although usually safe, they may not meet the required security policy of the organization.

Once executed, codes may jam the network, cause considerable irreversible damage to the local database, workstations and servers, or result in unauthorized retrieval of information from the servers/workstations. Such elements may appear on Java applets, ActiveX components, DLLs and other object codes, and their use is increasing at an unparalleled pace. The majority of these small programs are downloaded into the organization unsolicited and uncontrolled. The enterprise has no way of knowing about their existence or execution and there is no system in place for early detection and prevention of the codes from being executed.

The security problem was solved. partially by the browser manufacturers which allow the user to disable the use of executables. Of course this is not a reasonable solution, since all the electronic commerce and advertising are based on the use of executables. The security problem is much more serious once such an executable can approach the enterprise servers, databases and other workstations.

In a copending patent application of the same applicant herein, IL 120420, filed on Mar. 10, 1997, the specification of which is incorporated herein by reference, a method is described and claimed, for selectively preventing the downloading and execution of undesired Executable Objects in a computer, which comprises the steps of:

(a) providing one or more Control Centers, each connected to one or more gateways, each gateway serving one or more end user computers;

(b) providing means coupled to each of said gateways, to detect Executable Objects reaching said gateway, to analyze the header of each of said Executable Objects, and to determine the resources of the computer that the Executable Object needs to utilize;

(c) providing means coupled to each of said gateways, to store each end user computer Security Policy representing the resources, or combination of resources, that the adminstrator allows or does not allow an Executable Object to utilize within its destination, wherein the Security Policy is received from and/or stored in each of said one or more Control Centers;

(d) when an Executable Object is detected at the gateway:
  1. analyzing the header of said Executable Object;
  2. determining the resources of the computer that the Executable Object needs to utilize;
  3. comparing the resources of the computer that the Executable Object needs to utilize with the Security Policy and;
    (i) if the resources of the computer that the Executable Object needs to utilize are included in the list of the resources allowed for use by the Security Policy, allowing the Executable Object to pass through the gateway and to reach the computer which has initiated its downloading; and
    (ii) if the resources of the computer that the Executable Object needs to utilize are included in the list of the resources prohibited for use by the Security Policy, preventing the Executable Object from passing through the gateway, thereby preventing it from reaching the computer which has initiated its downloading.

A Control Center (CC) may be a central control unit, e.g., a PC or other computer. which is connected to a plurality of gateways, and which updates the memory means containing relevant date, e.g., the Security Policy. Once the CC is updated, e.g., by the addition of an additional limitation to the Security Policy, all gateways are updated at once. The use of the CC to control the operation of the security elements of the gateways obviates the need (which exists in prior art systems) to update each gateway every time that a change in policy is made.

A LAN (Local Area Network) may be (but is not limited o), e.g., a network of computers located in an office or building. The LAN is typically connected to outside communications networks, such as the World Wide Web, or to more limited LANs, e.g., of a client or supplier, through one or more gateways. The larger the organization, the larger the number of gateways employed, in order to keep communications at a reasonable speed.

Generally speaking, a LAN can also be made of a plurality of smaller LANs, located geographically nearby or far apart, but even if small LANs are found within the same organization, the security requirements may vary from one department to the other, and it may be necessary to keep high security levels, including preventing Executables from migrating from one department to the other, even within the same organization.

The means coupled to each of said gateways, to detect Executable Objects reaching said gateway, to analyze the header of each of said Executable Objects, and to determine the resources of the computer that the Executable Object needs to utilize may be of many different types. Typically, the executable object is "trapped" and analyzed at the gateway by listening on the communication line to the TCP/IP protocol, as well as to the object transfer protocols, such as SMTP, HTTP, FTP, etc. Hooking into the communication line and extracting the contents of the header of the executable object are steps which are understood by the skilled person, and which can be effected by means of conventional programming, and they are therefore not described herein in detail, for the sake of brevity.

Once the header of the Executable Object (EO) has been analyzed, comparing the resources of the computer that the EO needs to utilize with the Security Policy can be easily done, e.g., by comparing them with a look-up table provided to the gateway by the CC, which represents the Security Policy. Comparison can also be carried out against the data stored in the CC, and in such a case specific memory means and comparing means may not be necessary in the gateway. However, speed and performance considerations will often dictate that such operations be carried out at the gateway itself.

Prior art solutions provide for the analysis of communication taking place via a single port, Port 80, which is the port commonly employed for web surfing. However, today it is possible to surf the net through ports other than Port 80, while the HTTP server of the user, according to currently available technology, cannot work on a plurality of ports. Therefore, if more than one user employ a gateway simultaneously, prior art systems are ineffective since they are not suitable for the simultaneous analysis of communication taking place via other ports.

Another severe drawback is that a very strong HTTP server is needed to serve a plurality of users, when operating according to the prior art method.

The art has so far failed to provide an efficient method for processing EOs, which is independent of the port used, and which does not require an extraordinarily strong server to be implemented. It is therefore clear that such a solution is needed, particularly in view of the ever growing use of the web by many organizations.

SUMMARY OF THE INVENTION

It is an object of the present invention to provide an efficient method for processing Executable Objects which overcomes the aforesaid drawbacks of prior art systems.

It is another object of the invention to provide such a method which is easy to implement and which does not require significant hardware changes.

It is a further object of the invention to provide a method which permits to analyze the executables "on the fly", and does not hinder the downloading and he operation of harmless executables.

It is yet another object of the invention to provide apparatus for carrying out the method of the invention.

Other advantages and objects of the invention will become apparent as the description proceeds.

The invention is directed, inter alia, to a method for processing Executable Objects, comprising:
 (a) providing analysis means capable of non-interfering analysis of data packets transmitted on a communication line between a browser and an HTTP server on the web, said communication line being established through a gateway;
 (b) analyzing the handshake between said browser and said server, to detect a "GET_" command sent by the user and an HTTP code sent in response by said server;
 (c) when such an HTTP code is detected, analyzing the data packets transmitted by said server to said browser, by:
  (1) providing ordering means to order data packets received in non-sequential order, and to forward them in sequential order to header checking means;
  (2) checking the data packets so as to analyze the contents of the header of the Executable Object, and to identify the resources of the system that it needs to employ;
  (3) transmitting to said gateway data. representing the resources of the system that the Executable Object needs to utilize; and
  (4) providing data packet suppressing means coupled to said gateway, such that if the resources of the system that the Executable Object needs to utilize are not permitted according to the security policy set by the administrator, at least one data packet belonging to the Executable Object is suppressed, altered or damaged, so as to prevent the execution thereof by the browser.

According to a preferred embodiment of the invention, the method further comprises identifying the user communicating through the gateway, and the server to which said user is connected, and coupling all activities and analyses to said user. This procedure is needed at times when more than one user connects through the gateway simultaneously. Then, a plurality of users connects to a plurality of servers. Therefore, it is necessary to keep track of the specific user who has requested a specific Executable Object from a specific server, so as to properly handle packets received at the gateway from any individual server.

In another preferred embodiment of the invention, the method further comprises storing in memory means checksums representing Executable Objects analyzed, together with values indicative of whether any such Executable Object complies or not with the Security Policy, and checking any incoming Executable Object against said stored values, prior or in parallel to analyzing it, whereby to discard any Executable Object identified thereby as being non-compliant with the Security Policy, and allowing Executable Objects identified thereby as being compliant with the Security Policy to pass the Gateway and reach the user. As will be apparent to the skilled person, this procedure may streamline and speed-up the analysis of Executable Objects, since verifying a checksum is a procedure which is quicker and simpler than the full analysis procedure of the EO's header.

DETAILED DESCRIPTION OF PREFERRED EMBODIMENTS

Figure 1:
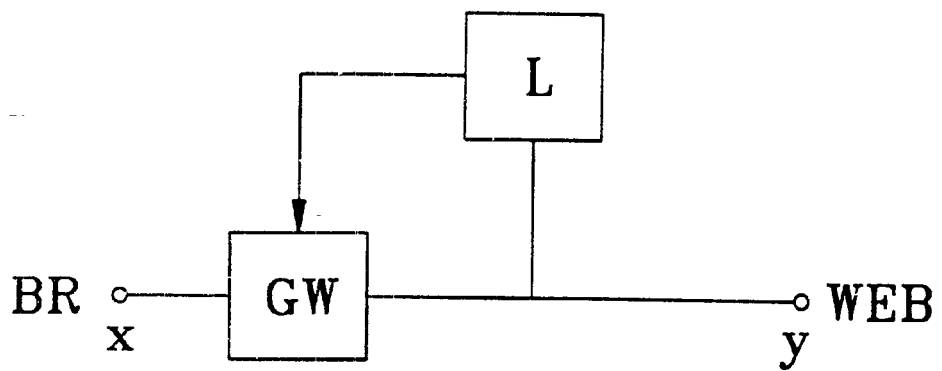
FIG. 1 is a schematic representation of a communication mode between a browser and an HTTP server on the web, through a gateway, including additional analysis means, according to a preferred embodiment of the invention.

The method of the invention will now be illustrated with reference to a preferred embodiment thereof. In FIG. 1, a typical situation is shown, in which a browser, BR, (running on an end user's computer) is connected to the web through a gateway, GW. In FIG. 1 only one browser BR is show, for the sake of simplicity, although of course the gateway GW is designed to service a plurality of browsers. Similarly, gateway GW is shown to be connected only to one HTTP server on the web (designated "WEB"), although it can of course be connected to a plurality of servers on the web, and the connection is not a point-to-point connection.

According to this preferred embodiment of the invention, analyzing means, L, are provided, which are connected to the communication line on the one hand, and to the gateway on the other hand. Analyzing means L are passive means, only capable of "listening" to the talk carried out on the line, between the browser BR and the server WEB. L is further capable of sending a signal to gateway GW.

Data communication between the browser and the HTTP server is made in small packets, the ensemble of which constitutes an entity, which may or may not be an Executable Object. The packets are not necessarily transmitted sequentially, and this fact makes it even harder to analyze them. Packets are transmitted from WEB to BR as a result of a handshake carried out between the browser and the HTTP server. An executable object is downloaded as a result of a message sent by the user, including the command "GET_", which command is echoed in the handshake by the HTTP server which sends in response an HTTP code preceding the requested EO.

Thus, according to the invention, the first step in the process of identifying the data being transmitted as a potentially harmful executable object is to analyze the first four bytes being transmitted by the HTTP server (WEB), and to determine whether they contain a response to the command "GET_", sent by the user, in the form of an HTTP code. If they do, the rest of the transmitted string must also be analyzed to determine whether it contains a Java applet or other undesirable EO. The way in which the packets are processed will be further described below.

If the analyzing means L determine that an Executable Object is involved as discussed above, then the header of the EO must be analyzed to check it compliance with the security policy set by the user. It should again be emphasized that the analyzing means L only "listen in", but do not interfere with the transmission of the string.

Figure 2:
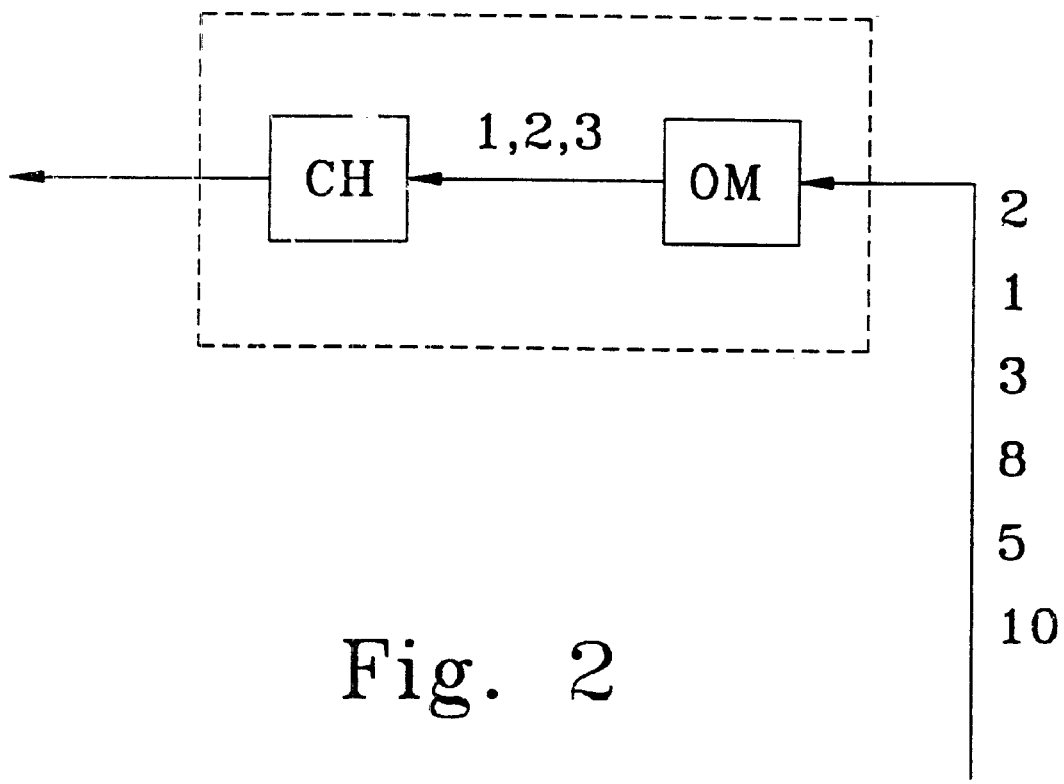
FIG. 2 illustrates the situation existing in an analysis means according to one preferred embodiment of the invention, with respect to the processing of data packets.

The analyzing means comprise different functional elements. In the first part, the packets received are stored and ordered sequentially, so that the header thereof can be analyzed. This is schematically shown in FIG. 2, in which the analyzing means L are seen to comprise ordering means, OM, which receive the packets as they are transmitted, orders them and passes them on in the correct order. For instance, in the example seen in the figure, six packets are seen to nave been transmitted, in the order 2, 1, 3, 8, 5, 10. Packets 1, 2, 3 have been ordered sequentially and sent on to the checker, CH, but since packet 4 has not yet been transmitted, the remaining packets (5, 8 and 10) are kept in the OM, until they can be released. Packet 5 will be released only after packet 4 arrives, and packet 8 only after packets 6 and 7 have arrived, and so on. This delay which takes place in the OM, it should once again be emphasized, does not affect the transaction which is taking place between the browser BR and the HTTP server, WEB, and all packets are transferred normally, in their non-sequential order. However, the invention takes advantage of the fact that, even if the packets continue to be transmitted, the EO cannot function if one of the packets is missing or damaged. Therefore, it is sufficient for the gateway to take care of suppressing or damaging one packet, which the gateway does once it receives a signal from the Checker indicating that the header of the EO comprises commands which are forbidden according to its security policy. Thus, according to the invention, the transmission of the data is not disturbed, the analysis of the packets is done in a non-interfering manner, and the transmission is only affected if it is desired to prevent an EO from running on the end user's computer. Another advantage of the method of the invention is that only data preceded by a reply to a "GET_" command needs to be analyzed, and furthermore any string needs to be analyzed only up to the point where it can be determined that it does not contain an undesirable EO.

As stated, according to a preferred embodiment of the invention, as stated, if the resources of the computer that the Executable Object needs to utilize are included in the list of the resources allowed for use by the Security Policy, no steps are taken by the system to prevent the Executable Object from passing through the gateway and reaching the computer which has initiated its downloading. However, if the resources of the computer that the Executable Object needs to utilize are included in the list of the resources prohibited for use by the Security Policy, steps will be taken to prevent the Executable Object from passing through the gateway. Such steps may include, e.g., deleting a packet of the EO, or garbling part of it, so as to make it inoperative, etc.

The invention is not limited to any specific EO. However, according to a preferred embodiment of the invention, it is desirable to analyze EO's including, inter alia Java Applets, Active-X, OCX, Win32 Executables, DLLs, or the like executable objects. However, as will be apparent to the skilled person, EO's are constantly developed, and the invention is by no means intended to be limited to the use with specific EOs, and the actual nature of the EO is not of critical importance.

All the above description of preferred embodiments has been provided for the sake of illustration, and is not intended to limit the invention in any way, except as defined by the claims. Many modifications may be effected in the invention. For instance, a variety of Executable Objects can be monitored, different ordering means and analyzing means can be applied, as well as header analyzing methods, all without exceeding the scope of the invention.

What is claimed is:

1. A method for processing Executable Objects comprising:
    (a) providing analysis means capable of non-interfering analysis of data packets transmitted on a communication line between a browser and an HTTP server on an internet, said communication line being established through a gateway;
    (b) analyzing handshaking between said browser and said server, to detect a "GET_" command sent by a user and an HTTP code sent in response by said server;
    (c) when such an HTTP code is detected, analyzing the data packets transmitted by said server to said browser, by:
        (1) providing ordering means to order data packets received in non-sequential order, and to forward them in sequential order to header checking means;
        (2) checking the data packets so as to analyze contents of a header of an Executable Object, and to identify resources of a computer system that the Executable Object needs to employ;

(3) transmitting to said gateway data representing the resources of the computer system that the Executable Object needs to utilize;

(4) providing data packet suppressing means coupled to said gateway, such that if the resources of the computer system that the Executable Object needs to utilize are not permitted according to a security policy set by an administrator, at least one data packet belonging to the Executable Object is suppressed, altered or damaged, so as to prevent the execution thereof by the browser.

2. A method according to claim 1, further comprising identifying the user communicating through the gateway, and the HTTP server to which said user is connected, and coupling all activities and analyzes to said user.

3. A method according to claim 2, further comprising storing in memory means checksums representing Executable Objects analyzed, together with values indicative of whether any such Executable Object complies or not with the Security Policy, and checking any incoming Executable Object against said stored values, prior to analyzing, whereby to discard any Executable Object identified thereby as being non-compliant with the Security Policy, and allowing Executable Objects identified thereby as being compliant with the Security Policy to pass the Gateway and reach the user.

4. A method according to claim 1, further comprising storing in memory means checksums representing Executable Objects analyzed, together with values indicative of whether any such Executable Object complies or not with the Security Policy, and checking any incoming Executable Object against said stored values, prior to analyzing, whereby to discard any Executable Object identified thereby as being non-compliant with the Security Policy, and allowing Executable Objects identified thereby as being compliant with the Security Policy to pass the Gateway and reach the user.

5. A method for processing Executable Objects downloaded to a computer system, the method comprising:

analyzing data packets communicated between a browser and a server through a gateway to detect an HTTP code preceding an Executable Object sent by the server in response a "GET_" command sent by the browser;

ordering the data packets transmitted by the server to the browser in a sequential order; and checking a header of the ordered data packets to identify resources of the computer system that the Executable Object utilizes, and determining if the resources are permitted according to a security policy, such that if the resources are not permitted according to the security policy at least one of the ordered data packets is prevented from passing through the gateway to the browser.

6. The method according to claim 5, wherein the at least one of the ordered data packets is prevented from passing through the gateway to the browser by suppressing the at least one of the ordered data packets.

7. The method according to claim 5, wherein the at least one of the ordered data packets is prevented from passing through the gateway to the browser by altering the at least one of the ordered data packets.

8. The method according to claim 5, wherein the at least one of the ordered data packets is prevented from passing through the gateway to the browser by damaging the at least one of the ordered data packets.

9. The method according to claim 5, further comprising storing in memory checksums representing Executable Objects analyzed and a value corresponding to each checksum representing whether or not the Executable Object complies with the security policy, and checking data packets sent by the server for Executable Objects and comparing checksums of the checked Executable Objects with the stored checksums prior to analyzing the data packets;

wherein Executable Objects with matching checksums and the corresponding value representing that the Executable Objects are non-compliant with the security policy are not permitted to pass through the gateway to the browser; and wherein Executable Objects with matching checksums and the corresponding value representing that the Executable Objects are compliant with the security policy are permitted to pass through the gateway to the browser.

* * * * *